United States Patent [19]

Kilpatrick

[11] 4,142,001

[45] Feb. 27, 1979

[54] PREPARATION OF FROZEN RAW BATTERED PRODUCTS

[75] Inventor: John S. Kilpatrick, Richmond, Canada

[73] Assignee: Rupert's Certi-Fresh Foods, Inc., Seattle, Wash.

[21] Appl. No.: 795,118

[22] Filed: May 9, 1977

[51] Int. Cl.² .......................... A23L 3/36; A21D 10/04
[52] U.S. Cl. ...................................... 426/302; 426/310
[58] Field of Search ................ 426/524, 302, 310, 92, 426/100, 552

[56] References Cited

U.S. PATENT DOCUMENTS

| | | | |
|---|---|---|---|
| 2,974,497 | 3/1961 | Carpenter et al. | 426/524 |
| 3,213,634 | 10/1965 | Granata | 426/524 |
| 3,368,363 | 2/1968 | Alaburda et al. | 426/524 |
| 3,607,313 | 9/1971 | Roth | 426/302 |
| 3,868,470 | 2/1975 | Fallon et al. | 426/302 |

*Primary Examiner*—Jeanette M. Hunter
*Attorney, Agent, or Firm*—William P. Green

[57] ABSTRACT

Method for producing frozen raw battered food products by first applying a coating of the raw batter to the outside of the food product, and then depositing the coated product on a layer of carbon dioxide snow, in a relation causing the batter while still uncooked to set to a non-flowing condition by reduction in temperature of the batter while it is contacted and supported by the layer of carbon dioxide snow.

13 Claims, 4 Drawing Figures

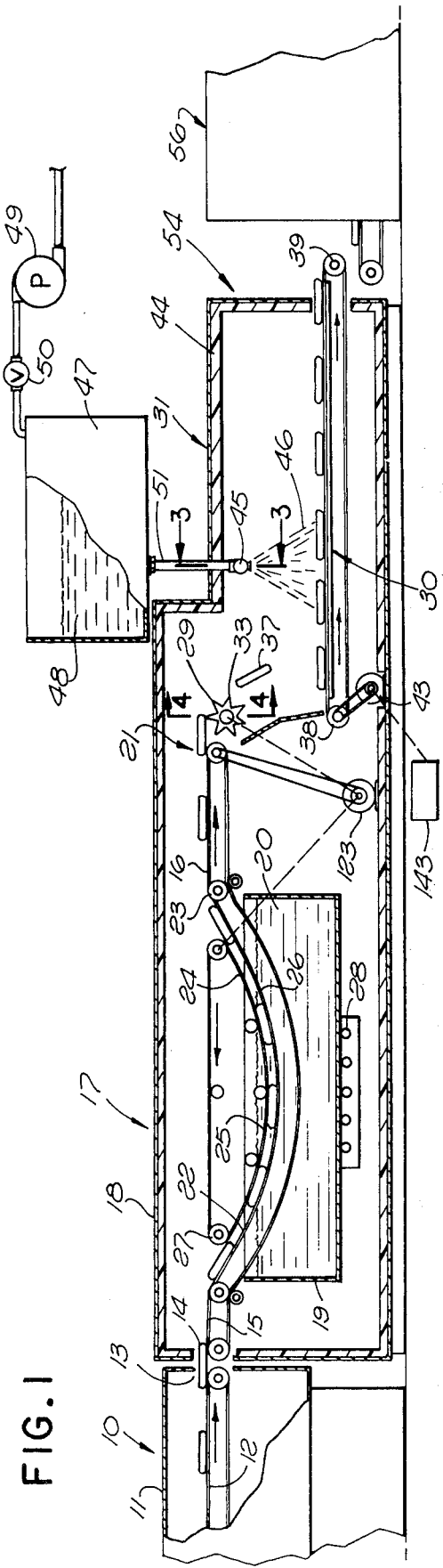
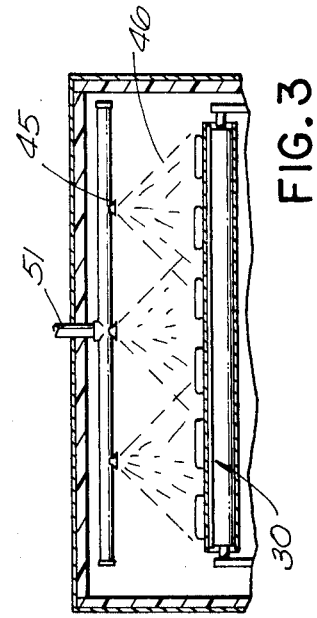
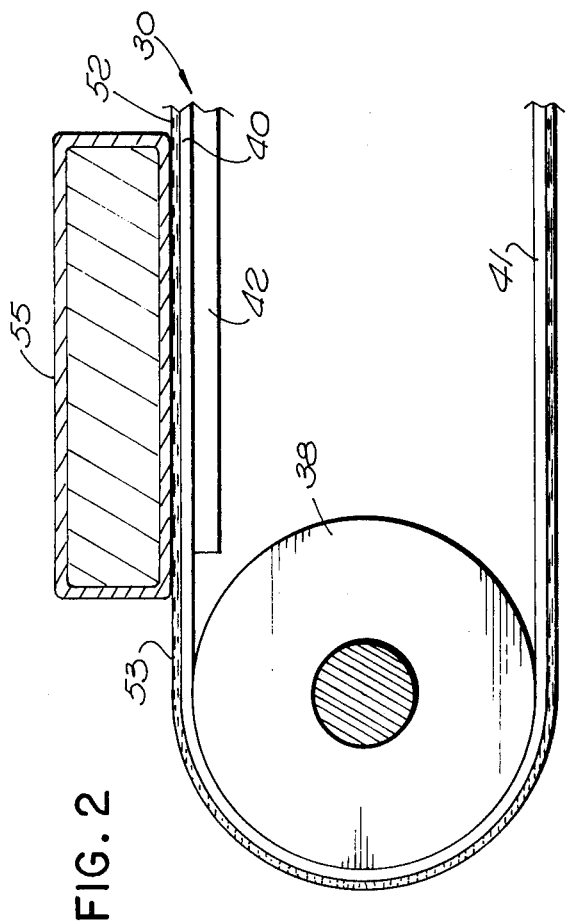
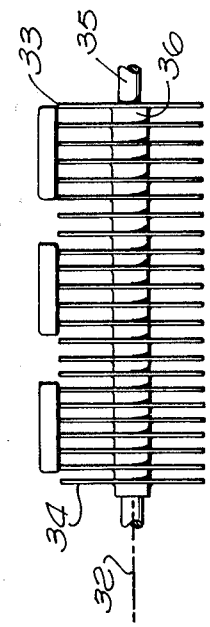

PREPARATION OF FROZEN RAW BATTERED PRODUCTS

BACKGROUND OF THE INVENTION

This invention relates to improved methods and apparatus for producing frozen food products which are coated with batter.

The conventional method of producing frozen battered food products, such as for example individual portions of fish, other seafood, or the like, is to first apply the batter to the food product in raw form, then partially cook the batter to set it to a non-flowing condition, and then ultimately freeze the coated product for sale in frozen form. The batter may be applied by advancing the food products on a conveyor through a container of batter, with the products after leaving this conveyor being dropped into a body of hot cooking oil for attaining the partial cooking effect. The food products may be pre-frozen before application of the batter and remain cold even after a short interval in the hot oil, so that only the batter is partially cooked. The final freezing step may be attained by any conventional freezing process, including if desired, the spraying of carbon dioxide snow onto the upper surface of the coated product while moving along a final convenyor.

Such use of partial cooking of the batter for setting it to a non-flowing condition has several decided disadvantages. In the first place, the process is very wasteful of energy, in that the coating of batter on the food product is first heated to a high temperature for partial cooking, and then immediately frozen to a very low temperature for ultimate packaging. Both of these steps require the expenditure of a substantial amount of energy, much of which is wasted since the elevation of temperature for the partial cooking step is completely counterproductive insofar as the final freezing step is concerned. Whatever energy is added to heat the product during the partial cooking must be removed in the final freezing step. Further, oil absorbed by the batter during the partial cooking process may detract from the quality of the ultimate product by virtue of the tendency for the oil to become rancid. In addition, the types of batters which can be fried at the extremely high temperatures and in the very short periods of time required in this conventional process are more complex than would be desired, and can not be the types of very inexpensive and simple batters which are usable under other circumstances. These batters which must be employed for the discussed process can not be very thin batters because of the tendency for excessive crumb formation in the partial frying process, nor can they be crisp batters, which are extremely fragile and can not be shipped after partial frying and freezing.

Canadian Pat. No. 823,139 issued September 16, 1969 refers to a process in which a battered food product may be frozen while the batter is raw, by immersion of the coated product in liquid nitrogen. This process, however, would be extremely expensive, and would have the disadvantage of producing an undesirably violet reaction at the time of immersion of the product in the liquid, tending to cause much of the liquid batter to be lost from the surface of the product and accumulate in the bottom of the cooling liquid tank.

SUMMARY OF THE INVENTION

The present invention provides a unique process for producing a frozen food product which has a coating of batter in raw form, and which can be produced at extremely low cost. The process eliminates the ncessity for partial or complete cooking of the batter coating, to thus avoid the waste of energy inherent in such cooking. The present process also allows for much greater versatility in selection of different types of batters and products to be treated, and enables use of much simpler and less expensive batters than can be employed where the partial cooking step is required. In addition, the ultimate food product which results when a frozen food product formed in accordance with the present invention is finally cooked is in most instances superior to that produced when the precooking step is employed, since the double cooking of the batter detracts from the qualities of flavour and texture of the finished product, and, as mentioned previously, the oil absorbed by the batter during the partial cooking process tends to become rancid or oxidized during storage. The oil is much more subject to deterioration than the other components of the food.

To achieve these results, I utilize a unique process in which the food product after being coated with raw batter is deposited on a layer or bed of carbon dioxide snow, with the initially liquid batter being contacted and supported directly by the snow while the batter is set to essentially non-liquid condition by reduction in its temperature. The batter though initially liquid does not stick to the structure which supports the layer of snow, and is set to non-liquid form extremely rapidly and almost instantaneously, so that thereafter the coated product can be handled mechanically or manually for packaging.

The layer of carbon dioxide snow is preferably maintained on the upper surface of a conveyor, which may take the form of an endless conveyor belt acting to move the layer of snow and the coated products supported thereby from a predetermined pick-up location to a discharge location at which the products leave the conveyor. Additional carbon dioxide snow may be sprayed onto the coated products as they are advanced by the conveyor to the discharge location. The sprayers for thus discharging the snow onto the conveyor at a location downstream of the point at which the food products are initially placed on the conveyor may deliver the snow to the conveyor in a quantity sufficient to maintain the desired layer of snow on the surface of the conveyor as the return run of the conveyor moves back toward the initial pick-up location, in a relation assuring without additional spraying means the presence of an adequate thickness of snow on the conveyor when the food products fall onto it. However, if desired, additional carbon dioxide snow may be applied to the conveyor belt shortly before the product falls onto the bed of carbon dioxide snow.

BRIEF DESCRIPTION OF THE DRAWING

The above and other features and objects of the invention will be better understood from the following detailed description of the typical embodiment illustrated in the accompanying drawing in which:

FIG. 1 is a diagrammatic representation of apparatus and a method for producing a batter coated product in accordance with the invetion:

FIG. 2 is an enlarged fragmentary side view of the initial portion of the batter setting and freezing apparatus; and FIGS. 3 and 4 are vertical sections taken on lines 3—3 and 4—4 respectively of FIG. 1.

DESCRIPTION OF THE PREFERRED EMBODIMENT

Referring first to FIG. 1, there is represented diagrammatically at 10 any conventional type of freezing unit within which the food products to be treated are desirably pre-frozen. The products may typically be serving or bite size portions of fish, fish patties, shrimp, prawns, other seafood, or virtually any other type of food product which may be coated with batter. If desired, the freezing unit 10 may be dispensed with, and the products to be treated may be sawn or otherwise cut or stamped from frozen blocks of fish, meat, or other food; or the products may be previously frozen elsewhere and held in cold storage until required. This food is normally not precooked, and is moved along the interior of the housing 11 of unit 10 on the conveyor 12 toward a discharge end 13, with suitable means being provided in unit 10 for refrigerating the product before it reaches the exit end 13.

From unit 10, the frozen portions 14 of the fish or other food product being treated are delivered onto the pick-up end 15 of a conveyor 16 of a batter applying unit 17. This unit 17 may be of a known construction, having an outer housing 18 which may or may not be insulated, within which there is located a container 19 holding a quantity of batter 20 to be applied to the food items 14. The batter may be of any convenient known formulation, having sufficient fluidity to pass the food items 14 therethrough, and having sufficient viscosity to adhere to and to form a coating about those products. Conveyor 15 advances the food items 14 to the right in FIG. 1, from the pick-up end 15 to the discharge end 21. At the location of the tank 19, the conveyor has a portion 22 which advances downwardly into and through the batter 20, to move the frozen food items through the batter in completely submerged form for coating all surfaces of each of the items with the batter. As will appear, the conveyor 16 is formed as an endless belt, guided along its endless path by a number of rollers 23, one or more of which are continuously driven at a uniform rate by a motor 123 to advance the upper run of the conveyor to the right in FIG. 1.

Above the conveyor 16, there is provided a top conveyor 24, having a run 25 which is spaced above and extends parallel to the top run of conveyor 16, and which acts to hold the food items 14 in submerged relation within the batter as they pass therethrough. This top conveyor 24 is mounted for movement along its endless path by a number of rollers 27, with one or more of these rollers being driven by motor 123 to advance the lower run 25 of belt 24 rightwardly at the same rate as the upper run 26 of lower conveyor 16. Both of these conveyors 16 and 24 are desirably formed of stainless steel mesh or other similar material adapted to allow relatively free flow of the batter to all surfaces of the food items, including the upper and lower surfaces which are contacted by the conveyor, so that by the time the food products reach the discharge end of conveyor 16 they are entirely coated by the batter. The batter within container 19 is preferably prechilled, typically by refrigeration coils represented at 28; or by a scraped surface heat exchanger; or by the use of chilled water in mixing the batter; or by the addition of carbon dioxide snow to the batter, which will also provide some additional leavening action. Desirably, this batter is precooled to a temperature at least as low as 60° F. and preferably between about 40 and 60°F.

At the right end of conveyor 16, the coated food products 14 move onto a discharge wheel 29 of a known type capable of contacting the food products at only a number of very localized regions and then dropping the product downwardly onto the conveyor 30 of the batter setting and freezing unit 31. At the time that the coated products 14 reach wheel 29, the batter is still completely raw and uncooked, and is therefore still in very liquid condition. If contacted directly by any type of smooth uninterrupted surface in this condition, that surface would tend to wipe some or all of the batter from the food item, leaving it very incompletely coated. To avoid such extended surface contact with the coated item, the unit 29 is a rotary wheel turning about a horizontal axis 32 and having a large number of points 33 at many different locations spaced circularly about the axis and spaced in a direction parallel to the axis. As seen in FIG. 4, these points 33 may be formed by a number of 'star wheels' 34, mounted on a common shaft 35, with spacers 36 between the successive wheels 34. Each of the wheels 34 has a number of evenly circularly spaced points 33 (typically seven such points) so that together the many points 33 of all of the wheels 34 will contact the undersurfaces of the food items 14 at a relatively few localized points, at which the liquid batter coating is temporarily penetrated, but with the batter running back together and completing the continuous coat on the outer surface of the item 14 as soon as contact with points 33 ceases. The wheel 29 is driven in a clockwise direction as viewed in FIG. 1, by motor 123 or otherwise at a rate corresponding in the rate of advancement of the food items 14 rightwardly by conveyor 16, to sucessively contact and move food items 14 rightwardly across the top of the point contact wheel 29, and drop the items downwardly at the right of the wheels 29 as represented for example at 37 in FIG. 1.

Conveyor 30 of unit 31 is an endless belt which is mounted by rollers 38 and 39 for advancement along an endless path. The top run 40 of the belt advances rightwardly, and desireably is horizontal, while the bottom or return run 41 advances leftwardly. The top run 40 may be supported as it moves rightwardly by a horizontal plate 42 located beneath that run. One or both of the rollers 38 or 39 are driven to advance the endless belt at a rate corresponding essentially to the rate of advancement of belt 16, with the drive for belt 30 typically being represented as including a motor 43 driving the roller 38. The motor may have a speed varying control 143 to enable the belt 31 to be driven at different speeds for allowing different cooling intervals within unit 31. The belt 30 is formed of a non-corroding material capable of withstanding freezing temperatures without adverse effect, such as for example a closely woven stainless steel mesh.

Unit 31 has a heat insulated housing 44, which is typically illustrated as forming in effect a continuation of the housing of the unit 17. In actual practice, however, there will usually be a space between the two units at the location of wheel 33, to allow easy assembly of the apparatus, and to allow inspection of the product as it falls onto the bed of carbon dioxide snow. The interior of unit 31 is maintained at a very low temperature by the presence of carbon dioxide snow and vapor. A number of spray nozzles 45 are mounted in the upper portion of housing 44 near its entrance end, but preferably downstream of the feed wheel 29, and act to spray carbon dioxide snow downwardly toward and onto the conveyor in flaring patterns as represented at 46 in FIGS. 1 and 3. As seen in FIG. 3, the different nozzles 45 may be located in alignment with one another transversely of the path of advancement of the food product, with the patterns of the different nozzles supplementing one another to direct carbon dioxide snow downwardly onto the conveyor across its entire width. The carbon dioxide which is fed to nozzle 45 is received from a tank 47 within which a body 48 of liquid carbon dioxide at low temperature is maintained under pressure. The carbon dioxide may be fed into this tank in any convenient manner, as by a pump represented at 49, with a valve 50 being closed when the pump is not in operation to maintain the tank under pressure. The pressure in tank 47 forces the liquid carbon dioxide downwardly through a line 51 leading to the nozzle 45, to force the liquid in spray form downwardly from the nozzles, with the liquid converting instantaneously to solid snow form upon emission from the nozzles into the atmospheric pressure condition maintained within the interior of housing 31.

The rate of emission of carbon dioxide snow downwardly onto the upper run of conveyor 30, and onto the food products 14 carried by that upper run, is rapid enough to assure development and continual maintenance of a thin layer or bed 52 of carbon dioxide snow on the entire endless outer surface of belt 30. Each time that the apparatus is being prepared for use, belt 30 and nozzles 45 are placed in operation before any of the food product is delivered to the apparatus, so that the nozzles may gradually build up the desired thin layer of carbon dioxide snow on the surface of belt 30 (on the upper surface of top run 40 and the undersurface of bottom run 41). The snow adheres to the surface for return leftwardly at the underside of belt 30 so that after a short period of operation of the belt and nozzles, there is the desired layer of carbon dioxide snow at the location 53 in FIG. 2, to the left of the point at which the food items 14 are to ultimately fall onto the conveyor. This carbon dioxide snow adheres to the belt sufficiently to maintain the desired layer on the belt. The layer of snow may in some instances be very thin, say for example as small as one millimeter in thickness, so long as at all locations across the surface of the belt at least some snow is present to prevent direct contact of the batter on food items 13 with the surface of the belt itself.

After the snow layer has been built up on conveyor 30, the items 14 can be passed through the batter coating unit 17 and to the location of wheel 29, to be dropped downwardly thereby onto the conveyor 30 for advancement rightwardly through the interior of unit 30 and toward its discharge end 54. As the coated items 14 are falling downwardly from wheel 29, the batter on the surface of these items is in liquid form, as previously mentioned, and is still in that liquid flowable form when the coated item reaches the layer of snow 52 on belt 30. Because the batter does not contact the belt 30 directly, but is shielded therefrom by the snow layer, the batter can not adhere to the belt. Further, immediately upon contacting the snow, the liquid batter commences to convert to a non-flowable condition by virtue of the rapid reduction in temperature of the batter. The batter sets up extremely rapidly to a non-flowing condition, without loss of a substantial amount of batter from the surface of the item, and in a manner maintaining a continuous coating of the set batter about the entire outer surface of the food item 14. That layer of batter is represented at 55 in FIG. 2. As the food items are moved rightwardly by the upper run of belt 30, they pass beneath nozzles 45, to have sprayed onto the upper surfaces of the coated food products additional carbon dioxide snow, which further refrigerates the products and assures maintenance of a completely frozen state of each coated item by the time it reaches exit end 54. The food products may or may not tumble as they move along the top of conveyor 30, and are ultimately discharged from the right end of conveyor 30 to packaging equipment represented diagrammatically at 56. Alternatively at this point the food products may be transferred to a conventional freezing tunnel where their temperature may be further reduced before packaging. The atmosphere within housing 44 of unit 31 is kept at an extremely low temperature by the carbon dioxide sprayed therein. During operation of the equipment, the rate of discharge of snow from nozzles 45, and the rate of advancement of conveyor 30, may be regulated to give the proper dwell time for any particular size and type of food product being treated to assure full freezing of the batter and the product by the time it reaches the exit end of housing 44, and with the sprays being controlled to always maintain the layer of snow over the entire surface of belt 30, including its upstream end 53.

As previously indicated, the present process can be performed with any of numerous different conventional types of batter, which may be much simpler in composition than the batters required for some prior processes. For example, one typical extremely simple batter which may be employed is formulated as follows:

| 500 grams | soft wheat flour |
|---|---|
| 769 milliliters | water |
| 16 grams | salt |
| 13 grams | baking powder |

Though a typical embodiment of the invention has been shown and described in detail, it will of course be understood that the invention is not to be considered as limited to this particular form, but includes in addition all variations falling within the scope of the appended claims. I claim:

1. The method that comprises:
    applying a coating of raw batter to the outside of a food product;
    placing said food product coated with said batter on a layer of carbon dioxide snow while the batter remains uncooked; and
    rapidly setting the coating of completely uncooked batter on the food product to an essentially non-flowing condition by reduction in temperature of the batter coating while contacted by said layer of carbon dioxide snow.

2. The method as recited in claim 1, including pre-cooling said food product before application of said raw batter thereto.

3. The method as recited in claim 1, including pre-freezing said food product before application of said batter thereto, and applying the batter while the food product is frozen.

4. The method as recited in claim 1, including pre-chilling said raw batter and applying it to the food product while in pre-chilled condition.

5. The method as recited in claim 1, including pre-freezing said food product, pre-chilling said raw batter, and applying said raw batter while chilled to said food product while frozen.

6. The method as recited in claim 1, including spraying carbon dioxide snow onto said coated food product while the latter is supported by said layer of carbon dioxide snow.

7. The method as recited in claim 1, including advancing said layer of carbon dioxide snow and said coated food product thereon along a predetermined path after the product has been positioned on the carbon dioxide snow, and spraying additional carbon dioxide snow onto said coated product as it moves along said path.

8. The method that comprises:
advancing a conveyor along a predetermined path;
maintaining a layer of carbon dioxide snow on the upper surface of said conveyor;
applying a coating of raw batter to the outside of a food product;
placing said food product coated with said uncooked batter on said layer of carbon dioxide snow;
advancing said layer of snow and said food product thereon along said path by said movement of the conveyor; and
rapidly setting the coating of raw batter on the food product to an essentially non-flowing condition by reduction in temperature of the batter coating while contacted by said layer of carbon dioxide snow.

9. The method as recited in claim 8, in which said coating of raw batter is applied to said food product by advancing the food product by additional conveyor means through a container of said batter to cause the batter to adhere to the outer surfaces of the food product.

10. The method as recited in claim 8, in which said food product is placed on said layer of carbon dioxide snow by being dropped downwardly onto the snow while coated with said batter.

11. The method as recited in claim 8, in which said step of applying the coating to said food product is attained by advancing a second conveyor along a second path toward the first conveyor, placing said food product in uncoated form on said second conveyor for movement therewith toward the first conveyor, and directing said second conveyor and the food product thereon through a container of batter to cause some of the batter to adhere to the food product and coat its outer surfaces, said step of placing the coated food product on the layer of snow being effected by dropping the food product coated with batter from the level of the discharge end of said second conveyor onto said layer of carbon dioxide snow on the first conveyor at a lower level.

12. The method as recited in claim 11, including prefreezing said food product before application of the batter thereto, prechilling said batter, and passing the food product while frozen through the prechilled batter.

13. The method as recited in claim 12, including spraying carbon dioxide snow onto said coated food product and conveyor as they move along said first path and beyond a point at which the coated food product is dropped onto the first conveyor.

* * * * *